(12) United States Patent
Tan

(10) Patent No.: US 12,290,155 B2
(45) Date of Patent: May 6, 2025

(54) EXPANDABLE TACKLE BAG

(71) Applicant: Thousand Oaks Corp., Irwindale, CA (US)

(72) Inventor: Roger Tan, Chino, CA (US)

(*) Notice: Subject to any disclaimer, the term of this patent is extended or adjusted under 35 U.S.C. 154(b) by 1334 days.

(21) Appl. No.: 16/925,226

(22) Filed: Jul. 9, 2020

(65) Prior Publication Data

US 2021/0007451 A1    Jan. 14, 2021

Related U.S. Application Data

(63) Continuation-in-part of application No. 29/697,566, filed on Jul. 9, 2019, and a continuation-in-part of application No. 29/697,570, filed on Jul. 9, 2019.

(60) Provisional application No. 62/872,243, filed on Jul. 9, 2019, provisional application No. 62/872,249, filed on Jul. 10, 2019, provisional application No. 62/872,247, filed on Jul. 10, 2019.

(51) Int. Cl.
| | |
|---|---|
| *A45C 7/00* | (2006.01) |
| *A45F 3/04* | (2006.01) |
| *A45F 3/14* | (2006.01) |
| *A01K 97/06* | (2006.01) |
| *A45C 3/00* | (2006.01) |

(52) U.S. Cl.
CPC ............ *A45C 7/0086* (2013.01); *A45C 7/009* (2013.01); *A45F 3/047* (2013.01); *A45F 3/14* (2013.01); *A01K 97/06* (2013.01); *A45C 2003/008* (2013.01); *A45F 2003/142* (2013.01)

(58) Field of Classification Search
CPC . A45C 7/009; A45C 7/0086; A45C 2003/008; A45F 3/047; A45F 3/14; A45F 2003/142

USPC .......................................................... 190/100
See application file for complete search history.

(56) References Cited

U.S. PATENT DOCUMENTS

| | | | |
|---|---|---|---|
| 258,393 | A | 5/1882 | Endicott |
| 1,482,678 | A | 2/1924 | Figley |
| 1,791,346 | A | 2/1931 | Burch et al. |
| 2,028,339 | A | 1/1936 | Abraham et al. |

(Continued)

FOREIGN PATENT DOCUMENTS

| | | |
|---|---|---|
| CN | 101066048 A | 11/2007 |
| CN | 101088330 A | 12/2007 |

(Continued)

OTHER PUBLICATIONS

Amazon/Pascifun—Amazon "Piscifun Fishing Tackle Backpack"—As early as Jun. 2, 2018.

(Continued)

*Primary Examiner* — Sue A Weaver
(74) *Attorney, Agent, or Firm* — J. Andrew Reed; Think Differently Legal, PLLC

(57) ABSTRACT

A portable storage device having a main storage compartment and an expandable storage compartment. The main storage compartment may have a front wall, a rear wall, a first side wall, a second side wall, and a bottom wall, with each of said walls being of a cloth like material. The main storage compartment may have a removably coupled top coupled to the main storage compartment through a fastener. The expandable storage compartment may have a front folding section, a first side folding section, a second side folding section, and a bottom folding section.

4 Claims, 9 Drawing Sheets

(56) References Cited

U.S. PATENT DOCUMENTS

| | | |
|---|---|---|
| 2,102,977 A | 12/1937 | Shoemaker et al. |
| 2,316,833 A | 4/1943 | Baron |
| 2,554,668 A | 5/1951 | Charles |
| 2,595,463 A | 5/1952 | Kamps |
| 2,616,209 A | 11/1952 | Ploen |
| 2,717,470 A | 9/1955 | Holdeman |
| 2,730,833 A | 1/1956 | Newell |
| 2,956,365 A | 10/1960 | Smith et al. |
| 2,987,846 A | 6/1961 | Powell |
| 3,047,349 A | 7/1962 | Powell |
| 3,122,225 A | 2/1964 | Ward |
| 3,181,751 A | 5/1965 | Jean |
| RE25,826 E | 8/1965 | Ward |
| 3,310,271 A | 3/1967 | King |
| 3,481,066 A | 12/1969 | Woolworth |
| 3,564,755 A | 2/1971 | Lindgren, Sr. |
| 3,813,138 A | 5/1974 | Doohan |
| 3,850,396 A | 11/1974 | Orlandi |
| 4,023,304 A | 5/1977 | Singer |
| 4,151,938 A | 5/1979 | Barker et al. |
| 4,169,550 A | 10/1979 | Williams |
| 4,176,491 A | 12/1979 | Herring |
| D257,651 S | 12/1980 | Katz et al. |
| 4,240,222 A | 12/1980 | Covington |
| 4,245,422 A | 1/1981 | Souza |
| 4,324,446 A | 4/1982 | LeSage |
| D280,260 S | 8/1985 | Leiserson |
| D284,333 S | 6/1986 | Huston |
| D284,620 S | 7/1986 | Calton |
| D291,149 S | 8/1987 | Smith |
| 4,739,886 A | 4/1988 | Seaberg |
| 4,769,941 A | 9/1988 | Schmidt |
| D299,587 S | 1/1989 | Thomas |
| 4,811,996 A | 3/1989 | Hansson |
| 4,854,432 A | 8/1989 | Carpenter et al. |
| 4,958,730 A | 9/1990 | Bunten |
| D311,452 S | 10/1990 | Ehret |
| D312,530 S | 12/1990 | Gallen et al. |
| 5,054,669 A | 10/1991 | Zimbardi et al. |
| 5,087,105 A | 2/1992 | White |
| D333,038 S | 2/1993 | Collins |
| D336,218 S | 6/1993 | Hague |
| 5,217,119 A | 6/1993 | Hollingsworth |
| D341,026 S | 11/1993 | Barker |
| 5,261,529 A | 11/1993 | Holland |
| D347,521 S | 6/1994 | Elliott |
| D349,191 S | 8/1994 | Mason |
| D352,827 S | 11/1994 | Schildkraut |
| 5,386,662 A | 2/1995 | Vader et al. |
| D360,182 S | 7/1995 | Lovett |
| 5,454,477 A | 10/1995 | Bornhorst et al. |
| 5,505,297 A | 4/1996 | Myers |
| D371,051 S | 6/1996 | Melk |
| D371,052 S | 6/1996 | Melk |
| 5,526,907 A * | 6/1996 | Trawick .............. A45C 3/10 383/110 |
| 5,526,927 A | 6/1996 | McLemore |
| D371,724 S | 7/1996 | Melk |
| 5,556,068 A | 9/1996 | Gorelik |
| D376,044 S | 12/1996 | Trawick et al. |
| 5,606,820 A | 3/1997 | Suddeth |
| 5,630,537 A | 5/1997 | Sciacca |
| D381,871 S | 8/1997 | Melk |
| D382,108 S | 8/1997 | Wheeler |
| D383,601 S | 9/1997 | Jones et al. |
| 5,676,223 A | 10/1997 | Cunningham |
| D387,626 S | 12/1997 | Melk |
| D389,305 S | 1/1998 | Hauschild |
| D394,552 S | 5/1998 | Melk |
| 5,762,170 A | 6/1998 | Shyr et al. |
| 5,772,066 A | 6/1998 | Reynolds |
| D396,745 S | 8/1998 | Peterson |
| D398,083 S | 9/1998 | Martz |
| D401,062 S | 11/1998 | Hauschild |
| 5,829,185 A | 11/1998 | Myers |
| 5,908,147 A | 6/1999 | Chuang |
| D412,269 S | 7/1999 | Wyant |
| D414,932 S | 10/1999 | Platte, III |
| D416,680 S | 11/1999 | Latshaw |
| D423,779 S | 5/2000 | Goatcher |
| D427,768 S | 7/2000 | Bogert |
| D435,343 S | 12/2000 | Eskandry |
| 6,202,865 B1 | 3/2001 | Kuo |
| 6,202,910 B1 | 3/2001 | Swetish |
| 6,290,040 B1 | 9/2001 | Chen |
| 6,321,912 B1 | 11/2001 | Lippert et al. |
| D452,806 S | 1/2002 | King |
| 6,454,097 B1 | 9/2002 | Blanco |
| D465,086 S | 11/2002 | Watts |
| D465,134 S | 11/2002 | Joss |
| D468,101 S | 1/2003 | Hassett |
| D469,606 S | 2/2003 | Su |
| D471,012 S | 3/2003 | Peterson |
| 6,530,475 B1 | 3/2003 | Penney |
| D472,380 S | 4/2003 | Hillman |
| D472,386 S | 4/2003 | Bauer |
| D474,598 S | 5/2003 | Platte, III |
| D476,480 S | 7/2003 | Hillman |
| 6,595,604 B1 | 7/2003 | Peterson |
| 6,612,434 B1 | 9/2003 | Redzisz |
| D481,204 S | 10/2003 | Rada |
| D482,525 S | 11/2003 | Fair |
| D482,842 S | 12/2003 | Fair |
| D484,695 S | 1/2004 | DePalma |
| D485,144 S | 1/2004 | Levine et al. |
| D487,189 S | 3/2004 | Ukitsu et al. |
| D487,191 S | 3/2004 | Ong |
| D492,160 S | 6/2004 | Lanman et al. |
| 6,742,636 B2 | 6/2004 | Godshaw |
| D495,489 S | 9/2004 | Messina-Brown |
| 6,821,019 B2 | 11/2004 | Mogil |
| D504,229 S | 4/2005 | Duvigneau |
| D506,061 S | 6/2005 | McGibben |
| D507,734 S | 7/2005 | Willems |
| 6,926,136 B1 | 8/2005 | Lynch-Bass |
| D514,317 S | 2/2006 | Conforti |
| D528,295 S | 9/2006 | Harvey |
| D530,089 S | 10/2006 | Silverman |
| 7,162,890 B2 | 1/2007 | Mogil et al. |
| D542,031 S | 5/2007 | Zapata |
| D542,527 S | 5/2007 | Zapata |
| 7,240,513 B1 | 7/2007 | Conforti |
| D552,350 S | 10/2007 | Bosley |
| D556,452 S | 12/2007 | Hydon |
| D560,450 S | 1/2008 | Tagliati et al. |
| D566,393 S | 4/2008 | Kidakarn |
| D574,615 S | 8/2008 | Picot et al. |
| 7,568,566 B2 | 8/2009 | D'Ambrosio |
| 7,604,103 B2 | 10/2009 | Hamlin |
| D603,169 S | 11/2009 | Smith |
| 7,621,074 B2 | 11/2009 | Glidewell et al. |
| D620,254 S | 7/2010 | Noraker |
| 7,837,032 B2 | 11/2010 | Smeltzer |
| D634,543 S | 3/2011 | Scicluna et al. |
| D634,601 S | 3/2011 | Good |
| 7,937,884 B1 | 5/2011 | Naylor et al. |
| 7,941,965 B2 | 5/2011 | Hoover |
| D639,051 S | 6/2011 | Dare |
| D647,301 S | 10/2011 | Sosnovsky |
| 8,043,004 B2 | 10/2011 | Mogil |
| D648,533 S | 11/2011 | Sosnovsky |
| D660,589 S | 5/2012 | Ayjian |
| 8,348,510 B2 | 1/2013 | Mogil |
| D676,652 S | 2/2013 | Holloway et al. |
| 8,453,813 B2 | 6/2013 | Lai |
| D692,661 S | 11/2013 | Gupton |
| D692,662 S | 11/2013 | Pignotti |
| 8,621,720 B2 | 1/2014 | Kao et al. |
| D714,541 S | 10/2014 | Anderson et al. |
| D720,216 S | 12/2014 | Luburic et al. |
| 8,899,071 B2 | 12/2014 | Mogil |
| D724,318 S | 3/2015 | Myer |
| D725,908 S | 4/2015 | Zwetzig |
| 9,144,281 B2 | 9/2015 | Cross |

(56) References Cited

U.S. PATENT DOCUMENTS

| | | |
|---|---|---|
| D742,637 S | 11/2015 | Miles |
| 9,226,557 B2 | 1/2016 | Sullivan |
| D761,564 S | 7/2016 | Rhodes |
| D762,384 S | 8/2016 | Boroski |
| D762,978 S | 8/2016 | Boroski |
| 9,462,874 B1 | 10/2016 | Samuel |
| D779,824 S | 2/2017 | Boroski |
| D781,575 S | 3/2017 | Etekochay |
| D787,816 S | 5/2017 | Slimane |
| D793,728 S | 8/2017 | Faibish et al. |
| D796,188 S | 9/2017 | Ho et al. |
| 9,854,897 B1 | 1/2018 | Pelkey, Jr. et al. |
| D818,204 S | 5/2018 | Renforth |
| D821,097 S | 6/2018 | Burton et al. |
| D824,170 S | 7/2018 | Tobias |
| D828,112 S | 9/2018 | Furneaux |
| D831,952 S | 10/2018 | Pennington |
| D832,653 S | 11/2018 | Waskow et al. |
| D833,141 S | 11/2018 | Carter et al. |
| D835,473 S | 12/2018 | Jacobsen |
| D835,950 S | 12/2018 | Jacobsen |
| D836,999 S | 1/2019 | Jacobsen |
| D837,000 S | 1/2019 | Jacobsen |
| D837,001 S | 1/2019 | Jacobsen |
| D838,971 S | 1/2019 | Deanda |
| D844,324 S | 4/2019 | Hoppe et al. |
| D845,613 S | 4/2019 | Decker |
| D856,662 S | 8/2019 | Breines |
| D862,528 S | 10/2019 | Sullivan et al. |
| 10,477,991 B1 | 11/2019 | Fragala |
| D873,090 S | 1/2020 | Jacobsen |
| D874,129 S | 2/2020 | Goldstein |
| D875,385 S | 2/2020 | Carter et al. |
| D880,253 S | 4/2020 | Jacobsen |
| D881,655 S | 4/2020 | Jacobsen |
| D887,135 S | 6/2020 | Tan |
| D887,136 S | 6/2020 | Tan |
| D893,183 S | 8/2020 | Eisenhardt et al. |
| D896,504 S | 9/2020 | Li |
| D896,505 S | 9/2020 | Yuan |
| D896,514 S | 9/2020 | Tan |
| D898,349 S | 10/2020 | He |
| D901,882 S | 11/2020 | Tan |
| 10,881,178 B2 | 1/2021 | Johnson |
| D912,974 S | 3/2021 | Breines |
| D915,762 S | 4/2021 | Li |
| D915,770 S | 4/2021 | Breines |
| D919,287 S | 5/2021 | He |
| D920,744 S | 6/2021 | Eisenhardt et al. |
| D922,061 S | 6/2021 | Tan |
| D922,062 S | 6/2021 | Shi |
| D927,174 S | 8/2021 | Dai |
| D927,261 S | 8/2021 | Rong |
| 11,076,666 B2 | 8/2021 | Sullivan et al. |
| D931,600 S | 9/2021 | Huang |
| D932,179 S | 10/2021 | Mukri |
| D938,717 S | 12/2021 | Tan |
| D941,578 S | 1/2022 | Fernandes |
| 11,242,189 B2 | 2/2022 | Rogers |
| D947,524 S | 4/2022 | Tan |
| D964,123 S | 9/2022 | Peng |
| D979,244 S | 2/2023 | Luo |
| D982,316 S | 4/2023 | Miao |
| D984,119 S | 4/2023 | De Abreu |
| 11,673,344 B2 | 6/2023 | Chen |
| 2001/0042665 A1 | 11/2001 | Siwak |
| 2002/0181806 A1 | 12/2002 | Godshaw et al. |
| 2004/0065573 A1 | 4/2004 | Brouard |
| 2005/0016648 A1 | 1/2005 | Vakharia et al. |
| 2005/0077135 A1 | 4/2005 | Drew et al. |
| 2005/0082132 A1 | 4/2005 | Smith |
| 2005/0121275 A1 | 6/2005 | Platte |
| 2005/0161483 A1* | 7/2005 | Krohn .............. A45C 5/14 224/413 |
| 2005/0263364 A1 | 12/2005 | Sher |
| 2005/0279124 A1 | 12/2005 | Maldonado |
| 2006/0064852 A1 | 3/2006 | Willems |
| 2007/0011939 A1 | 1/2007 | Sakai |
| 2007/0214613 A1 | 9/2007 | Shiao |
| 2007/0228097 A1 | 10/2007 | Recanati |
| 2007/0237432 A1 | 10/2007 | Mogil |
| 2007/0245521 A1 | 10/2007 | Chehebar |
| 2008/0029666 A1 | 2/2008 | Hurt |
| 2008/0121554 A1 | 5/2008 | Townsend |
| 2008/0164265 A1 | 7/2008 | Conforti |
| 2008/0289925 A1 | 11/2008 | Sapyta |
| 2012/0043228 A1 | 2/2012 | Ezzo et al. |
| 2012/0286011 A1 | 11/2012 | Wegener |
| 2013/0043293 A1 | 2/2013 | Connell |
| 2013/0068776 A1 | 3/2013 | Patterson |
| 2013/0145581 A1 | 6/2013 | Bailey |
| 2014/0132131 A1 | 5/2014 | Thomas |
| 2014/0290025 A1 | 10/2014 | Custer |
| 2014/0360831 A1 | 12/2014 | Kao |
| 2015/0014108 A1 | 1/2015 | Vecellio |
| 2015/0101958 A1 | 4/2015 | Cross |
| 2016/0205913 A1 | 7/2016 | Aston et al. |
| 2016/0244239 A1 | 8/2016 | Nash |
| 2016/0374440 A1 | 12/2016 | Lundy et al. |
| 2017/0073146 A1 | 3/2017 | Kuhn et al. |
| 2018/0220759 A1 | 8/2018 | Johnson |
| 2018/0343995 A1 | 12/2018 | Dingler et al. |
| 2020/0205537 A1 | 7/2020 | Franco |
| 2021/0007451 A1 | 1/2021 | Tan |
| 2021/0007452 A1 | 1/2021 | Tan |
| 2021/0068510 A1 | 3/2021 | Johnson |
| 2021/0212442 A1 | 7/2021 | Webb |
| 2021/0368955 A1 | 12/2021 | Fernandes |
| 2023/0027563 A1 | 1/2023 | Fadal et al. |
| 2023/0232952 A1 | 7/2023 | Zucco |

FOREIGN PATENT DOCUMENTS

| | | |
|---|---|---|
| CN | 201360487 | 12/2009 |
| CN | 102972367 A | 3/2013 |
| CN | 205357836 U | 7/2016 |
| CN | 305294327 | 8/2019 |
| EP | 0071274 A2 | 2/1983 |
| GB | 6119047 | 2/2021 |
| JP | H07241210 A | 9/1995 |
| JP | D1128650 | 12/2001 |
| JP | D1173649 | 5/2003 |

OTHER PUBLICATIONS

Evolution Outdoor Drift Series Topless Horizontal Tackle Bag, first available Feb. 24, 2021, amazon.com [online], [site visited Jun. 28, 2021], Available at internet URL: https://www.amazon.com/Evolution-Outdoor-Topless-Horizontal-Tackle/dp/B08WRNXBXV?th=1&psc=1 (Year: 2021).

Evolution Outdoor Drift Series Topless Vertical Tackle Bag, first available Mar. 2, 2021, amazon.com [online], [site visited Jun. 28, 2021], Available at internet URL: https://www.amazon.com/Evolution-Outdoor-Topless-Vertical-Tackle/dp/B08WRVCF31?th=1 (Year: 2021).

KastKing Fishing Tackle Bag, first available Jun. 27, 2018, amazon.com [online], [site visited Jun. 28, 2021], Available at internet URL: https://www.amazon.com/KastKing-Saltwater-Waterproof-Medium-Hoss-15x11x10-25/dp/B07XRFSFPN/ref=pd_lpo_3?pd_rd_i=B07F2GH9VS&psc=1 (Year: 2018).

Plano Guide Series Tackle Bag, first available Feb. 10, 2020, amazon.com [online], [site visited Jun. 28, 2021], Available at internet URL: https://www.amazon.com/Piano-Premium-Storage-included-PLABG371/dp/B084NQLFMH/ref=pd_lpo_2?pd_rd_i=B084NQLFMH&psc=1 (Year: 2020).

Walmart—Ozark Trail Outdoor Equipment "Mesh Bottom Tackle Bag"—As early as 2019.

International Search Report and Written Opinion dated May 19, 2017 of PCT Application No. PCT/US2016/047971, 14 pages.

Academy, "H2O Xpress Pro Tackle Bag II," on sale at least as of Apr. 1, 2022 (https://www.academy.com/p/h2o-xpress-pro-tackle-bag-ii?sku=blue ) (Year: 2022).

(56) References Cited

OTHER PUBLICATIONS

Amazon, "Westfield Fishing Tackle Bag Water Resistant Soft Sided Waist Shoulder Carry Storage Hiking Climbing Fly," on sale at least as of Apr. 1, 2022 (https://www.amazon.co.uk/Westfield-Fishing-Resistant-Shoulder-Climbing/dp/B01H6WE47Y) (Year: 2022).

Bass Pro Shops, "Bass Pro Shops Advanced Anglers II Large Tackle System," on sale at least as of 204-01-2022, (https://www.basspro.com/shop/en/bass-pro-shops-advanced-anglers-ii-large-tackle-system) (Year: 2022).

Bass Pro Shops, "Cabela's Extreme Wide-Top Tackle Bag," on sale at least as of Apr. 1, 2022 (https://www.basspro.com/shop/en/cabelas-extreme-wide-top-3600-tackle-bag) (Year: 2022).

Bass Pro Shops, "Plano B-Series 3600 Tackle Bag," on sale at least as of Apr. 1, 2022 (https://www.basspro.com/shop/en/plano-b-series-3600-tackle-bag) (Year: 2022).

Walmart, "Ozark Trail 370 Large Pro Quick Access Soft Sided Fishing Tackle Bag", on sale at least as of Apr. 1, 2022. (https://www.walmart.com/ip/Ozark-Trail-370-Large-Pro-Quick-Access-Soft-Sided-Fishing-Tackle-Bag-Black/474776073 ) (Year: 2022).

Amazon, "Flambeau 4007 Heritage Tackle Bag, Fir Green/Pewter/Rust, FL40001", First on sale Apr. 23, 2020. (https://www.amazon.com/Fiambeau-Heritage-Bait-Binder/dp/B089469PPT) (Year: 2020).

U.S. Appl. No. 29/800,531, filed Jul. 21, 2021, Colt Fadal.

Plano A-Series 2.0 Quick Top, unknown first available date, planomolding.com [online], [site visited Jan. 9, 2023], Available at URL: https://planomolding.com/products/aseries-20-quick-top-plaba700?variant=4046805427 8304 (Year: 2023).

Plano Guide Series 3600 Tackle Bag, unknown first available date, tacklecove.com [online], [site visited Jan. 9, 2023], Available at URL:https://www.tacklecove.com/store/p/496-Plano-Guide-Series-3600-Tackle-Bag.aspx (Year: 2023).

Amazon, "Piscifun Fishing Tackle Backpack with 4 Trays Large Waterproof Tackle Bag Storage . . . ", (https://www .amazon . com/Piscifun-Backpack-Capacity-Waterproof-Protective/dp/B07CGJ DTN GI} (Year: 20 18), 13 pgs.

Flambeau 5007 Pro-Angler Tackle Bag (Grey/Red), first available Apr. 23, 2020, arnazon.com [online], [site visited Nov. 24, 2020], w Available from internet U RL: https://www.arnazon .corn/Fiarnbeau-5007 -Pro-Angler-Tackle-Grey/dp/B089458PL7 /ref=sr _1_22?dchild=1&gclid=EAiaiQobCh M 10uut0b6b 7QIVCDiGC% E2%80%A6 (Year: 2020).

Flambeau Heritage 4007 Tackle Bag, unknown first available date, DicksSportingGoods.com [online], [site visited Nov. 24, 2020], Available from internet U RL: https://www.dickssportinggoods.com/p/flambeau-heritage-4007-tackle-bag-20fmbaflmbhrtg3 70tbx/20fmbaflmbhrtg370tbx?sku=21521402&camp=CSE:%E2%80%A6 (Year: 2020).

KastKing Fishing Tackle Bags, first available Jun. 27, 2018, amazon.com [online], [site visited Nov. 14, 2018], Available from internet U R L: https : 1/www .amazon. com/d p/BO7F2HV28F/ref=sspa_dk_ detail_6?pd_rd_i=BO7XRFSFPN&pd_rd_w=a6HTH&pf_rd_p7d37a48b-2b1a-4373-8c1a-bd%E2%80%A6 (Year: 2018).

Okuma Fishing Tackle Soft Sided Tackle Bag, first available Oct. 23, 2015, amazon.com [online], [site visited Nov. 24, 2020], Available from internet U RL: https://www.arnazon.com/Okurna-Fishing-Tackle-Soft-Sided/dp/B018M56S28 (Year: 2015).

Evolution fishing drift series tackle backpack, posted at amazon.com, first available Feb. 23, 2022, retrieved on Jun. 6, 2023, online, https://www.amazon.com/Evolution-Fishing-Drift-Tackle-Backpack/dp/B09T5W2TXF (Year: 2022).

Igogi fishing tackle backpack, posted at amazon.com, first available Jul. 8, 2021, retrieved on Jun. 6, 2023, online, https://www.amazon.com/IGOGI-Fishi ng-Backpack-Holders-Without/dp/B098WPZY25 (Year: 2021).

Piscifun fishing tackle backpack, posted at amazon.com, first available Apr. 16, 2018, retrieved on Jun. 6, 2023, online, https://www.amazon.com/Piscifun-Backpack-Capacity-Waterproof-Protective/dp/B07C7R9696 (Year: 2018).

\* cited by examiner

EXPANDABLE TACKLE BAG

CROSS-REFERENCE TO RELATED APPLICATIONS

This application which claims the benefit of U.S. Provisional Application No. 62/872,243, filed Jul. 9, 2019, U.S. Provisional Application No. 62/872,249, filed Jul. 10, 2019, and U.S. Provisional Application No. 62/872,247, filed Jul. 10, 2019, is a continuation-in-part application of co-pending U.S. Design application Ser. No. 29/697,566, filed Jul. 9, 2019 entitled "Expandable Tackle Bag," and co-pending U.S. Design application Ser. No. 29/697,570, filed Jul. 9, 2019 entitled "Split Top Backpack," the technical disclosures of all of which are hereby incorporated by reference in their entirety.

BACKGROUND

Technical Field

The present disclosure relates to portable storage devices. More particularly, and not by way of limitation, the present disclosure is directed to an apparatus, system, and method for expandable storage compartments in portable storage devices for sporting goods.

Background

This section is intended to provide a discussion of related aspects of the art that can be helpful to understanding the embodiments discussed in this disclosure. It is not intended that anything contained herein be an admission of what is or is not prior art, and accordingly, this section should be considered in that light.

Bags are a convenient way to carry large or small items. Bags can have handles so that they can be carried by hand, or straps that allow the bags to be carried on a user's body. For example, slings or backpacks have straps that allow the bag to be carried on a user's shoulders. Likewise, a fanny pack has a strap that allows the bag to be carried around a user's waist.

Bags can be specially configured for specialized use cases. For example, tackle boxes are designed to allow a user to carry tackle gear, food, and/or clothing.

BRIEF SUMMARY

This summary provides a discussion of aspects of certain embodiments of the disclosure. It is not intended to limit the disclosure or any of the claimed subject matter. The summary provides some aspects but there are aspects and embodiments of the disclosure that are not discussed here.

The present disclosure is directed to portable storage device with an expandable storage section. The portable device can have a main storage compartment defined by a front wall, a rear wall, a first side wall, a second side wall, and a bottom wall, with each of said walls being of a cloth like material. The portable device may further have a top portion that is coupled to one or more of the said walls and capable of covering an opening defined by the main storage compartment, wherein the top portion has at least one securing mechanism to couple to a counterpart securing mechanism found on the outer side of the wall opposing the wall that the top portion is coupled to. The main storage compartment of the portable device can have an expandable storage compartment having a front section, a first side section, a second side section, a rear section, a bottom section, and a top section, and these sections may be coupled to the rear walls.

In another aspect, the present disclosure is directed to a portable storage device with an expandable storage compartment. The portable device can have an expandable storage compartment capable of expanding and compressing. The expandable storage compartment is defined by a front folding section, a first side folding section, a second side folding section, and a bottom folding section, with each of said walls being of a cloth like material. The portable device may further have a top connector that is coupled to one or more walls of the main storage compartment and capable of covering an opening defined by the expandable compartment, wherein the top connector has at least one securing mechanism to couple to a counterpart securing mechanism found on the outer side of the wall opposing the wall that the top connector is coupled to. The expandable storage compartment of the portable device can be sized and shaped to house at least one tray. The storage tray(s) can have a top section, a bottom section, and a securing mechanism to removably couple the top section and bottom section together.

In yet another aspect, the present disclosure is directed to a method of manufacture of a storage apparatus. The storage apparatus can be manufactured by cutting fabric like materials to create a front wall, rear wall, a first side wall, a second side wall, a bottom wall, and a removably coupled top of a main storage compartment. Additionally, there may be further cutting of fabric like materials to create a front folding section, a first side folding section, a second side folding section a rear folding section, and a bottom folding section of a foldable storage compartment. The cut pieces can then by sewn together to create the main storage compartment and the foldable storage compartment. A coupling through a stitching process of the main storage compartment and foldable storage compartment allows the first side folding section and the first side wall, the second side folding section and the second side wall, and the bottom section and bottom walls to be coupled to one another.

BRIEF DESCRIPTION OF THE DRAWINGS

The novel features believed characteristic of the disclosure are set forth in the appended claims. The disclosure itself, however, as well as a preferred mode of use, further objectives and advantages thereof, will be best understood by reference to the following detailed description of illustrative embodiments when read in conjunction with the accompanying drawings, wherein:

DETAILED DESCRIPTION

An embodiment of the disclosure will now be described. Fishing equipment such as tackle boxes often have storage compartments that prevent fishermen from viewing any secured content. Because many tackle boxes are often used while fishermen are standing in water, the fishermen often must risk exposing at least one entire storage compartment's contents to water to simply see or access stored items. Most tackle boxes are designed to store bait trays within their sealed storage compartments. Although bait trays often are designed to allow fishermen to view stored contents while sealed, fishermen often lose all visibility to a bait tray's contents when the bait tray is stowed inside a sealed tackle box.

One of the additional downfalls of these devices is that often there is no manner or means for adjusting a tackle box's storage size. In many cases, tackle boxes are designed to hold a static number of bait trays. When a fisherman requires less bait trays than a tackle box is designed to store, fishermen often must choose to either use a smaller tackle box, underfill bait trays, or underfill the tackle box.

Another of the additional downfalls of these devices is that often there is no manner or means for creating a flat surface inside a tackle box. In many cases a fisherman must utilize external devices to create a flat surface while standing in water. Often these external devices are not secured to the fisherman's body and carry the risk of falling into water.

The novel aspects disclosed herein describe an apparatus, system, and method for addressing these challenges.

Figure 1:
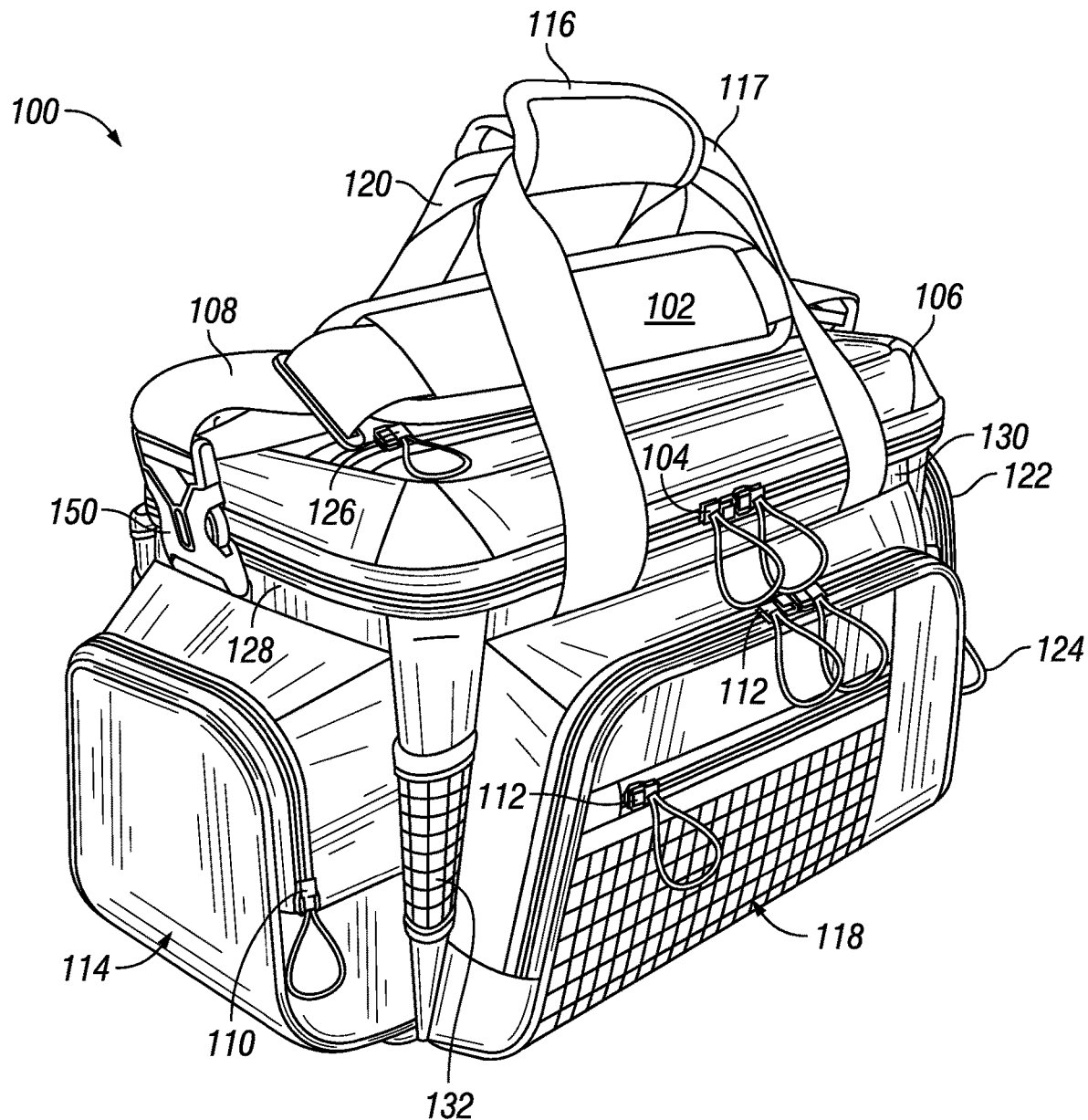
FIG. 1 is an illustration of an exterior of the main storage compartment of a tackle bag from a side angled perspective view.

FIG. 1 is an illustration of an exterior of the main storage compartment of a tackle bag from a side angled perspective view. The cloth tackle bag 100 may have a main storage compartment (not depicted). The main storage compartment can in at least one embodiment have a generally rectangular cross-sectional shape. The main storage compartment can have a first side wall, a second side wall, a front wall, a rear wall, and a bottom wall. The main storage compartment may further contain a removably coupled top 106. The first side wall, the second side wall, the front wall, the rear wall, and the bottom wall can, in some examples, have a rigid interior layer made of solid materials including, but not limited to, plastic, metal or other solid materials with exterior layers of supportive materials including, but not limited to, cloth, vinyl, canvas, or other similar materials. In at least one embodiment, the first side wall, the second side wall, the front wall, the rear wall, or the bottom wall can have both an interior and exterior composed of flexible materials such a cloth, vinyl, canvas, or other fabric like material. In some examples, a fabric like material may be cut or sewn to create the first side wall, the second side wall, the front wall, the rear wall, or the bottom wall of the main storage compartment.

At least one additional storage compartment capable of storing a plurality of items can attach to the walls of main storage compartment. In at least one example, the first side wall may have a first side storage compartment 114, the second side wall can have a second side storage compartment 122, and/or the front wall may have a front storage compartment 118 attached to the said wall. The first side storage compartment 114, the second side storage compartment 122, and/or the front storage compartment 118 can be detachable from or fixed to the walls of the main storage compartment. In at least one embodiment, the first side storage compartment 114, the second side storage compartment 122, and/or the front storage compartment 118 can be fixed to the walls of the main storage compartment using couplings including, but not limited to, stitching, thread, glue, adhesive, or other types of fasteners or combinations thereof. In another example, the first side storage compartment 114, the second side storage compartment 122, and/or the front storage compartment 118 may be detachable from the walls of the main storage compartment using detachable storage compartment fasteners including, but not limited to, zippers, hook and loop, buttons, snaps, fasteners or connections, or combinations thereof.

In some examples, the first side storage compartment 114, the second side storage compartment 122, and/or the front storage compartment 118 can have a rigid structure, a flexible structure or some combination thereof. In at least one example, the first side storage compartment 114, the second side storage compartment 122, and/or the front storage compartment 118 may have a rigid interior layer made of solid material including, but not limited to, plastic, metal or other solid materials with at least one exterior layer of supportive materials including, but not limited to, cloth, vinyl, canvas, or other similar materials or combinations thereof. The first side storage compartment 114, the second side storage compartment 122, and/or the front storage compartment 118 can have both an interior and exterior composed of flexible materials such a cloth, vinyl, canvas, or other similar materials or combinations thereof.

In at least one example, a removably coupled top fastener 104 can secure the removably coupled top 106 to the main storage compartment. The removably coupled top fastener 104 could include, but is not limited to, zippers, hook and loop fasteners, buttons, snaps, other fasteners or connections, or combinations thereof. The removably coupled top 106 may partially or completely seal the main storage compartment. A partially closed or sealed removably coupled top could allow the removably coupled top fastener 104 to seal or close the removably coupled top 106 onto the main storage compartment while maintaining partial visibility inside the main storage compartment. The partial visibility may be allowed with the removably coupled top 106 is made of flexible materials. In at least one example, the cloth tackle bag 100 may include materials that allow for resistance to water or other fluids, and create a sealed structure about at least a portion of the cloth tackle bag 100. The removably coupled top 106 can include a top storage pocket, which may be secured by a top storage pocket fastener 126.

In at least one example, a plurality of shoulder strap fasteners 150 can attach to the cloth tackle bag 100 to allow the shoulder strap 108 to partially or entirely disconnect from the cloth tackle bag 100. The shoulder strap fastener 150 may be attached to the removably coupled top 106, the first side wall, the second side wall, the rear wall, the front wall, or other similar areas of the cloth tackle bag 100 capable of supporting weight. The shoulder strap 108 can have a shoulder strap guard 102 made of material including, but not limited to, cloth, plastic, canvas, vinyl, or other similar materials or combinations thereof. The shoulder strap guard 102 may either slide loosely along the shoulder strap 108 or be fixed to the shoulder strap 108 using a plurality of shoulder strap guard fasteners including, but not limited to, stitching, thread, glue, adhesive, hook and loop, button and slot, snaps, or other types of fasteners or connections or combinations thereof.

A first side storage compartment 114 can contain at least one first side storage fastener 110. The first side storage fastener 110 could include, but is not limited to, zippers, hook and loop fasteners, buttons, snaps, other fasteners or connections, or combinations thereof. The first side storage compartment 114 may be detachable from or fixed to the first side wall 128. In at least one embodiment, the first side storage compartment 114 can be fixed to the first side wall 128 using a plurality of first side compartment fixed fasteners including, but not limited to, stitching, thread, glue, adhesive, hook and loop, button and slot, snaps, other types of fasteners or connections, or combinations thereof. In at least one example, the first side storage compartment 114 may be detachable from the first side wall 128 using a plurality of first side compartment fixed fasteners including, but not limited to, zippers, hook and loop fasteners, buttons, snaps, other fasteners or connections, or combinations thereof.

A second side storage compartment 122 can contain at least one second side storage fastener 124. The second side storage fastener 124 could include, but is not limited to, zippers, hook and loop fasteners, buttons, snaps, other fasteners or connections, or combinations thereof. The second side storage compartment 122 may be detachable from or fixed to the second side wall. In at least one embodiment, the second side storage compartment 122 can be fixed to the second side wall using a plurality of second side compartment fixed fasteners including, but not limited to, stitching, thread, glue, adhesive, hook and loop, button and slot, snaps, other types of fasteners or connections, or combinations thereof. In at least one example, the second side storage compartment 122 may be detachable from the second side wall using a plurality of second side compartment fixed fasteners including, but not limited to, zippers, hook and loop fasteners, buttons, snaps, other fasteners or connections, or combinations thereof.

A front storage compartment 118 can contain at least one front storage fastener 112. The front storage fastener 112 could include, but is not limited to, zippers, hook and loop fasteners, buttons, snaps, other fasteners or connections, or combinations thereof. The front storage compartment 118 may be detachable from or fixed to the front wall 130. In at least one embodiment, the front storage compartment 118 can be fixed to the front wall 130 using a plurality of front compartment fixed fasteners including, but not limited to, stitching, thread, glue, adhesive, hook and loop, button and slot, snaps, other types of fasteners or connections, or combinations thereof. In at least one example, the front storage compartment 118 may be detachable from the front wall 130 using a plurality of front compartment fixed fasteners including, but not limited to, zippers, hook and loop fasteners, buttons, snaps, other fasteners or connections, or combinations thereof.

In at least one embodiment, the cloth tackle bag 100 can have a plurality of storage pouches. Storage pouches such as a first side storage pouch 132 and a second side storage pouch 434 may be constructed of a plurality of materials including, but not limited to, cloth, plastic, canvas, vinyl, or other similar materials and/or combinations thereof. A first side storage pouch 132 can attach to the front wall 130, the first side wall 128, the rear wall, the front storage compartment 118, the first side storage compartment 114, and/or other locations on cloth tackle bag 100 or combinations thereof. Similarly, a second side storage pouch 434 may attach to the front wall 130, the second side wall 128, the rear wall, the front storage compartment 118, the second side storage compartment 122, and/or other locations on cloth tackle bag 100 or combinations thereof. The first side storage pouch 132 and the second side storage pouch 434 (shown in FIG. 4) can be fixed to or detachable from cloth tackle bag 100 using a plurality of storage pouch fasteners including, but not limited to, stitching, thread, glue, adhesive, hook and loop, button and slot, snaps, other types of fasteners or connections, or combinations thereof.

In at least one example, the cloth tackle bag 100 may have at least one shoulder strap 108. A shoulder strap 108 can attach to the removably coupled top 106, the first side wall 128, the second side wall, the rear wall, the front wall 130, or other similar areas of cloth tackle bag 100 capable of supporting weight. Shoulder strap 108 may be constructed of materials including, but not limited to, cloth straps, vinyl straps, rope, plastic straps, or other similar materials. A shoulder strap 108 can attach to or be detachable from the cloth tackle bag 100 using at least one shoulder strap fastener 150. A shoulder strap fastener 150 could include, but is not limited to, zippers, hook and loop fasteners, buttons, snaps, other fasteners or connections, or combinations thereof.

In at least one example, the cloth tackle bag 100 may have at least one handle 120. A handle 120 can be attached to the removably coupled top 106, the first side wall 128, the second side wall, the rear wall, the front wall 130 or other similar areas of the cloth tackle bag 100 capable of supporting weight. A handle 120 may be constructed of materials including, but not limited to, cloth straps, vinyl straps, rope, plastic straps, or other similar materials. The cloth tackle bag 100 can have at least one handle 120. The handle 120 can have a handle guard 116 constructed of materials including, but not limited to, cloth, plastic, canvas, vinyl, or other similar materials or combinations thereof. If the cloth tackle bag 100 has a plurality of a handles 120, a handle guard 116 may join the plurality of the handles 120 using a handle fastener 117. The handle fastener 117 could include, but is not limited to, zippers, hook and loop fasteners, buttons, snaps, other fasteners or connections, or combinations thereof.

Figure 2:
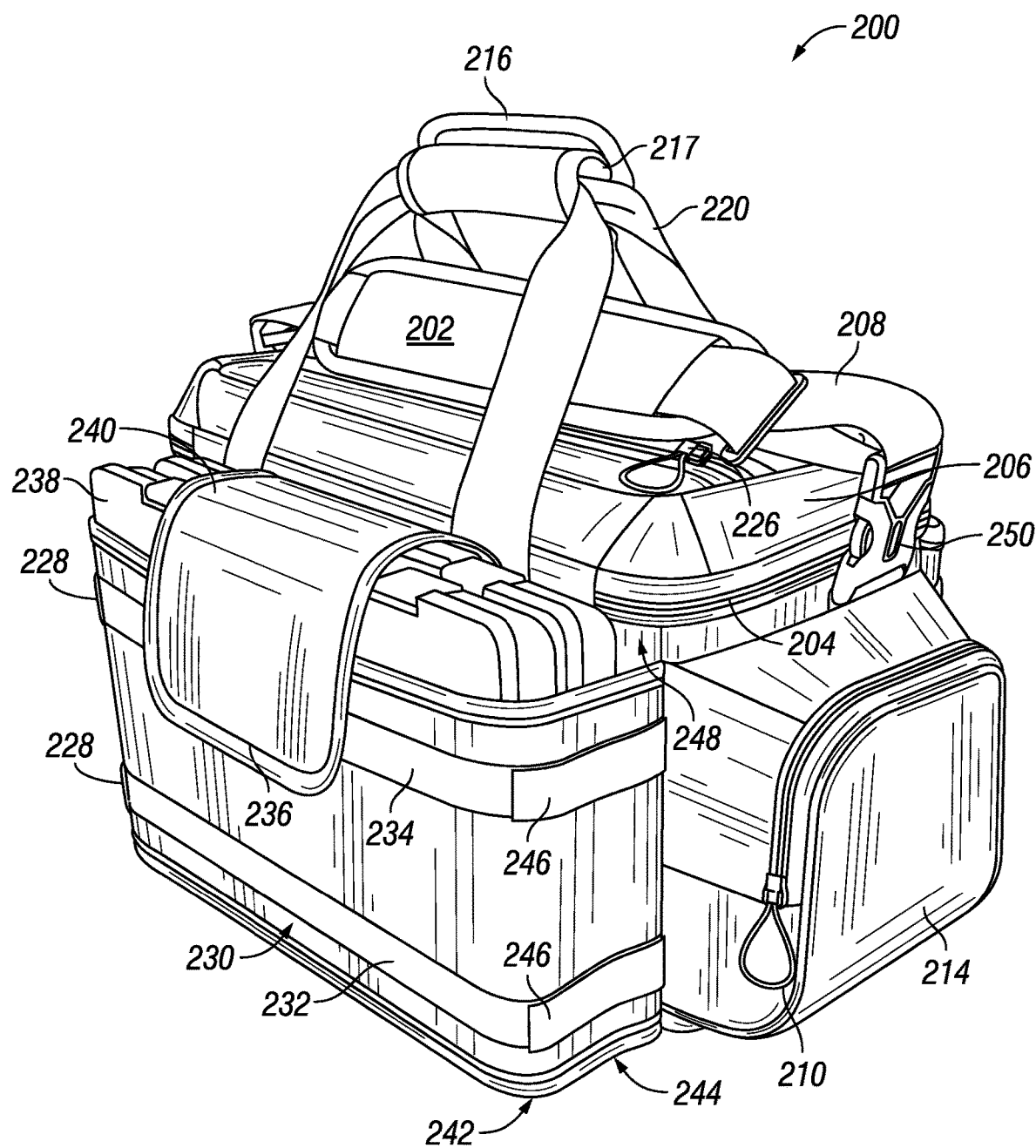
FIG. 2 is an illustration of a secured expanded tackle bag from a side perspective view.

FIG. 2 is an illustration of a secured expanded tackle bag 200 from a side perspective view. The cloth tackle bag 200 can have at least one handle 220. The handle 220 can have a handle guard 216 constructed of materials including, but not limited to, cloth, plastic, canvas, vinyl, or other similar materials or combinations thereof. If the cloth tackle bag 200 has a plurality of a handles 220, a handle guard 216 may join the plurality of the handles 220 using a handle fastener 217. The handle fastener 217 could include, but is not limited to, zippers, hook and loop fasteners, buttons, snaps, other fasteners or connections, or combinations thereof.

A first side storage compartment 214 can contain at least one first side storage fastener 210. The first side storage fastener 210 could include, but is not limited to, zippers, hook and loop fasteners, buttons, snaps, other fasteners or connections, or combinations thereof. The first side storage compartment 214 may be detachable from or fixed to the first side wall. In at least one embodiment, the first side storage compartment 214 can be fixed to the first side wall using a plurality of first side compartment fixed fasteners including, but not limited to, stitching, thread, glue, adhesive, hook and loop, button and slot, snaps, other types of fasteners or connections, or combinations thereof. In at least one example, the first side storage compartment 214 may be detachable from the first side wall using a plurality of first side compartment fixed fasteners including, but not limited to, zippers, hook and loop fasteners, buttons, snaps, other fasteners or connections, or combinations thereof.

In at least one example, the expandable storage compartment 230 can expand to create the expanded storage compartment 242. An expandable storage top connector 240 can be used to enclose the expanded storage compartment 242. The expandable storage top connector 240 may be adjustable using an expandable storage top fastener 236 to allow for the storage a plurality of equipment and other items inside the expanded storage compartment 242. The expandable storage top fastener 236 could include, but is not limited to, zippers, hook and loop fasteners, buttons, snaps, other fasteners or connections, or combinations thereof. Additionally, the expandable storage top connector 240 may allow for a plurality of widths to either fully or partially enclose the expandable storage compartment 230.

In at least one example, a plurality of fasteners such as the expandable storage compartment upper fastener 234 or the expandable storage compartment lower fastener 232 can be used to adjust the size of expandable storage compartment. An expandable storage compartment upper fastener 234 and an expandable storage compartment lower fastener 232 could include, but are not limited to, zippers, hook and loop fasteners, buttons, snaps, other fasteners or connections, or combinations thereof. The expandable storage compartment upper fastener 234 and expandable storage compartment lower fastener 232 may be fixed to expandable storage front folding section, expandable storage first side folding section 244, or expandable storage second side folding section using variety of expandable storage compartment fasteners including, but not limited to, stitching, thread, glue, adhesive, other types of fasteners or connections, or combinations thereof.

In at least one example, the expandable storage first side adjustable fastener 246 can secure the position of the first side folding section 244. The expandable storage first side adjustable fastener 246 could include, but is not limited to, zippers, hook and loop fasteners, buttons, snaps, or other fasteners. The expandable storage first side adjustable fastener 244 may connect to the expandable storage first side folding section 244 or the rear wall 248 using a plurality of expandable storage first side fasteners including, but not limited to, stitching, thread, glue, adhesive, or other types of fasteners or connections, or combinations thereof. In at least one embodiment, when one side of the first side adjustable fastener 246 connects to the first side folding section 244 or the rear wall 248 in a fixed manner, the other side of the fastener can connect to the expandable storage compartment upper fastener 234 or the expandable storage compartment lower fastener 232 in a removably coupled manner. This connection may allow the expandable storage first side adjustable fastener 246 to secure the first side folding section 244 in an expanded or compressed state. The expandable storage first side adjustable fastener 246 can have plurality of lengths allowing the fastener to connect to the expandable storage first side folding section 246 or the expandable storage front folding section.

In at least one example, the expandable storage second side adjustable fastener 228 may secure the position of the second side folding section. The expandable storage second side adjustable fastener 228 could include, but is not limited to, zippers, hook and loop fasteners, buttons, snaps, or other fasteners. The expandable storage second side adjustable fastener 228 can connect to the expandable storage second side folding section or the rear wall using a plurality of expandable storage second side fasteners including, but not limited to, stitching, thread, glue, adhesive, other types of fasteners or connections, or combinations thereof. In at least one embodiment, when one side of the second side adjustable fastener 228 connects to the second side folding section or the rear wall in a fixed manner, the other side of the fastener may connect to the expandable storage compartment upper fastener 234 or the expandable storage compartment lower fastener 232 in a removably coupled manner. This connection can allow the expandable storage second side adjustable fastener 228 to secure the second side folding section in an expanded or compressed state. The expandable storage second side adjustable fastener 228 may have plurality of lengths allowing the fastener to connect to the expandable storage second side folding section or the expandable storage front folding section.

In at least one example, the expandable storage compartment can achieve a plurality of sizes by attaching a first side adjustable fastener 246, a second side adjustable fastener 228, or an expandable storage top fastener 236 to expandable storage upper fastener 234 or expandable storage compartment lower fastener 232. In at least one example, the expandable storage compartment may be expanded by connecting the first side adjustable fastener 246 and the second side adjustable fastener 228 to the expandable storage upper fastener 234 and the expandable storage compartment lower fastener 232 along the expandable storage first side folding section. In this configuration, the expandable storage top fastener 236 can connect to the expandable storage upper fastener 234 to secure at least one item inside expandable storage compartment. In at least one other example, the expandable storage compartment may be contracted by connecting the first side adjustable fastener 246 and the second side adjustable fastener 228 to the expandable storage upper fastener 234 and the expandable storage compartment lower fastener 232 along the expandable storage front folding section. In this configuration, the expandable storage top fastener 236 can connect to the expandable storage compartment lower fastener 232 to compress the expandable storage compartment.

In at least one embodiment, the expandable storage top connector 240 may be secured to a wall of the main storage compartment such as the rear wall, or the removably coupled top 206 or the expandable storage compartment such as the expandable storage front folding section using a plurality of expandable storage top connector fasteners including, but not limited to, stitching, thread, or other similar materials. When one side of the expandable storage top connector 240 secures to the main storage compartment, the other side can connect to a section of the expandable storage compartment using the expandable storage top fastener 236. Conversely one side of the expandable storage top connector 240 secures to a section of the expandable storage compartment, the other side may connect to a wall of the main storage compartment using the expandable storage top fastener 236.

In at least one example, a removably coupled top fastener 204 can secure the removably coupled top 206 to the main storage compartment. The removably coupled top fastener 204 could include, but is not limited to, zippers, hook and loop fasteners, buttons, snaps, other fasteners or connections or combinations thereof. The removably coupled top 206 may partially or completely seal the main storage compartment. A partially sealed removably coupled top could allow the removably coupled top fastener 204 to seal the removably coupled top 206 onto the main storage compartment while maintaining partial visibility inside the main storage compartment. The removably coupled top 206 can include a top storage pocket, which may be secured by a top storage pocket fastener 226.

In at least one example, the expandable storage top connector 240 can allow partial visibility to items secured inside the expandable storage compartment. Partial visibility inside the expandable storage compartment could occur when the width of the expandable storage top connector 240 is narrower than the width of the expandable storage front folding section. In such a configuration, at least one item may be at least partially visible inside the expandable storage compartment while the expandable storage top connector 240 is secured to either a wall of the main storage compartment or a section of the expandable storage compartment. Persons of ordinary skill in the art can appreciate this configuration since the configuration may allow fishermen to view the contents of at least one bait tray 238 securely stored inside the expanded storage compartment.

The cloth tackle bag 200 can have an expandable storage compartment containing an expandable storage front folding section, an expandable storage bottom folding section, an expandable storage first side folding section, an expandable storage second side folding section, and an expandable storage top connector. The expandable storage front folding section, the expandable storage bottom folding section, the expandable storage first side folding section, the expandable storage second side folding section, and the expandable storage top connector may have a rigid interior layer made of solid material including, but not limited to, plastic, metal or other solid materials with exterior layers of supportive materials including, but not limited to, cloth, vinyl, canvas, or other similar materials or combinations thereof. In at least one example, expandable storage front folding section, the expandable storage bottom folding section, the expandable storage first side folding section, the expandable storage second side folding section, and the expandable storage top connector can have both an interior and exterior composed of flexible materials such a cloth, vinyl, canvas, or other similar materials or combinations thereof.

In at least one embodiment, fabric like material may be cut to create the folding sections of the expandable storage compartment including the expandable storage front folding section, the expandable storage bottom folding section, the expandable storage first side folding section 244, the expandable storage second side folding section, or the expandable storage top connector 240. In at least one example, the folding sections of the expandable storage compartment can be coupled to the walls of the main storage compartment such as rear wall using a plurality of couplings including, but not limited to, stitching, thread, or other similar materials. For example, the expandable storage bottom folding section may be coupled to the bottom wall, the expandable storage first side folding section 240 can be coupled with the first side wall, and the expandable storage second side folding section may be coupled with the second side wall using the expandable storage fasteners. The expandable storage top connector 240 can be coupled with the expandable storage front folding section, the rear wall, or the removably coupled top (not pictured). The fabric like material may include canvas, vinyl, thread, rope, synthetic fibers, polyester, other fabric or fabric like materials, or combinations thereof.

In at least one configuration, the expandable storage first side folding section 244, the expandable storage second side folding section and the expandable storage bottom folding section can expand to create expanded storage compartment 242. Similarly, in another configuration, the expandable storage front folding section may be compressed against the rear wall of the main storage compartment. In a compressed state, the expanded storage compartment can create the unexpanded storage compartment.

In at least one embodiment, the main storage compartment may have a removably coupled top 206. In some examples, the removably coupled top 206 can have a rigid interior layer made of solid material including, but not limited to, plastic, metal or other solid materials with exterior layers of supportive materials including, but not limited to, cloth, vinyl, canvas, and/or other similar materials. The removably coupled top 206 may have both an interior and/or exterior composed of flexible materials such a cloth, vinyl, canvas, and/or other similar materials.

In at least one embodiment, the main storage compartment can securely accommodate a plurality of items including, but not limited to, a bait tray 238. A bait tray 238 may have a structure including a top portion, a bottom portion, a plurality of walls, and at least one securing mechanism such as clasps, zippers, hook and loop, buttons, snaps, and/or other fasteners and/or connections or combinations thereof. In at least one embodiment, a bait tray 238 can be constructed of an at least partially transparent materials such as but not limited to, plastics, polycarbonates, silicon, thermoplastic polymers, synthetic materials, and/or combinations thereof which could allow a fisherman to view a bait tray's contents without opening the tray.

In at least one example, the expandable storage compartment may compress to create the unexpanded storage compartment. Securing the expandable storage top connector 236 to the expandable storage compartment lower fastener 232 using the expandable storage top fastener 236 can prevent the unexpanded storage compartment from expanding. Similarly, securing the first side adjustable fastener 246 or the second side adjustable fastener 228 to the expandable storage upper fastener 234 or the expandable storage compartment lower fastener 232 may prevent the unexpanded storage compartment from expanding.

In at least example of the present disclosure, the expandable storage compartment can expand and contract to a plurality of sizes. The expanded storage compartment may have the capacity to accommodate a plurality of items including the bait tray 238.

In at least one example, a plurality of shoulder strap fasteners 250 can attach to the cloth tackle bag 200 to allow the shoulder strap 208 to partially or entirely disconnect from the cloth tackle bag 200. The shoulder strap fastener 250 may be attached to the removably coupled top 206, the first side wall, the second side wall, the rear wall, the front wall, and/or other similar areas of the cloth tackle bag 200 capable of supporting weight. The shoulder strap 208 can have a shoulder strap guard 202 made of material including, but not limited to, cloth, plastic, canvas, vinyl, or other similar materials and/or combinations thereof. The shoulder strap guard 202 may either slide loosely along the shoulder strap 208 or be fixed to the shoulder strap 208 using a plurality of shoulder strap guard fasteners including, but not limited to, stitching, thread, glue, adhesive, hook and loop, button and slot, snaps, or other types of fasteners and/or connections or combinations thereof.

Figure 3:
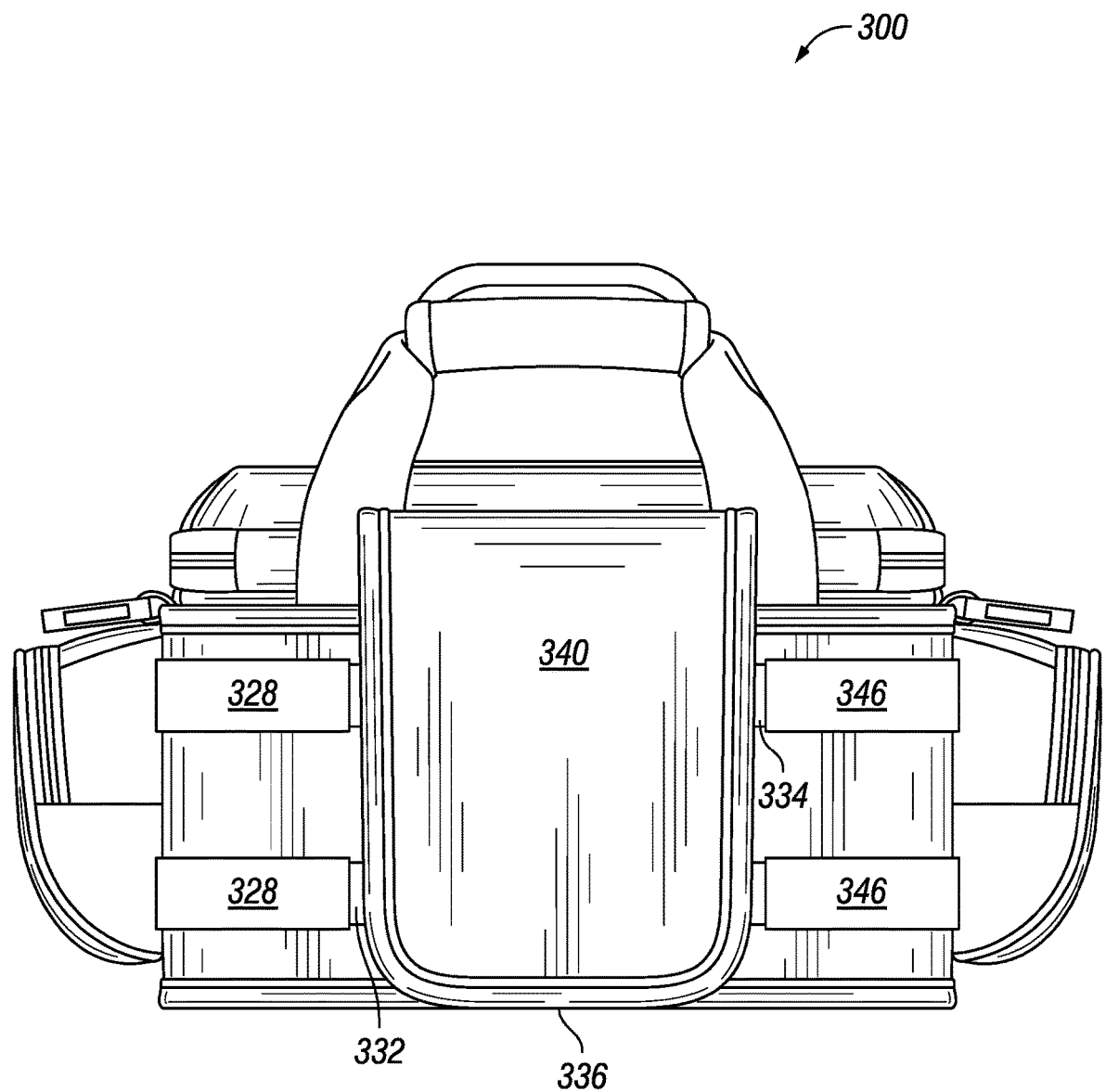
FIG. 3 is an illustration of a tackle bag from a back perspective view.

FIG. 3 is an illustration of a tackle bag 300 from a back perspective view. In at least one example, the expandable storage compartment upper fastener 334 and/or the expandable storage compartment lower fastener 332 can be a plurality of separate fasteners which may work in tandem to secure the expanded storage compartment or the unexpanded storage compartment 340. When the expandable storage compartment upper fastener 334 and/or expandable storage compartment lower fastener 332 is be split into a plurality of fasteners, the fasteners can have the capacity to secure the expandable storage compartment in an expanded or unexpanded configuration using the expandable storage top fastener 336, the first side adjustable fastener 346, the second side adjustable fastener 328, the expandable storage compartment upper fastener 334 or the expandable storage compartment lower fastener 332 or combinations thereof.

Figure 4:
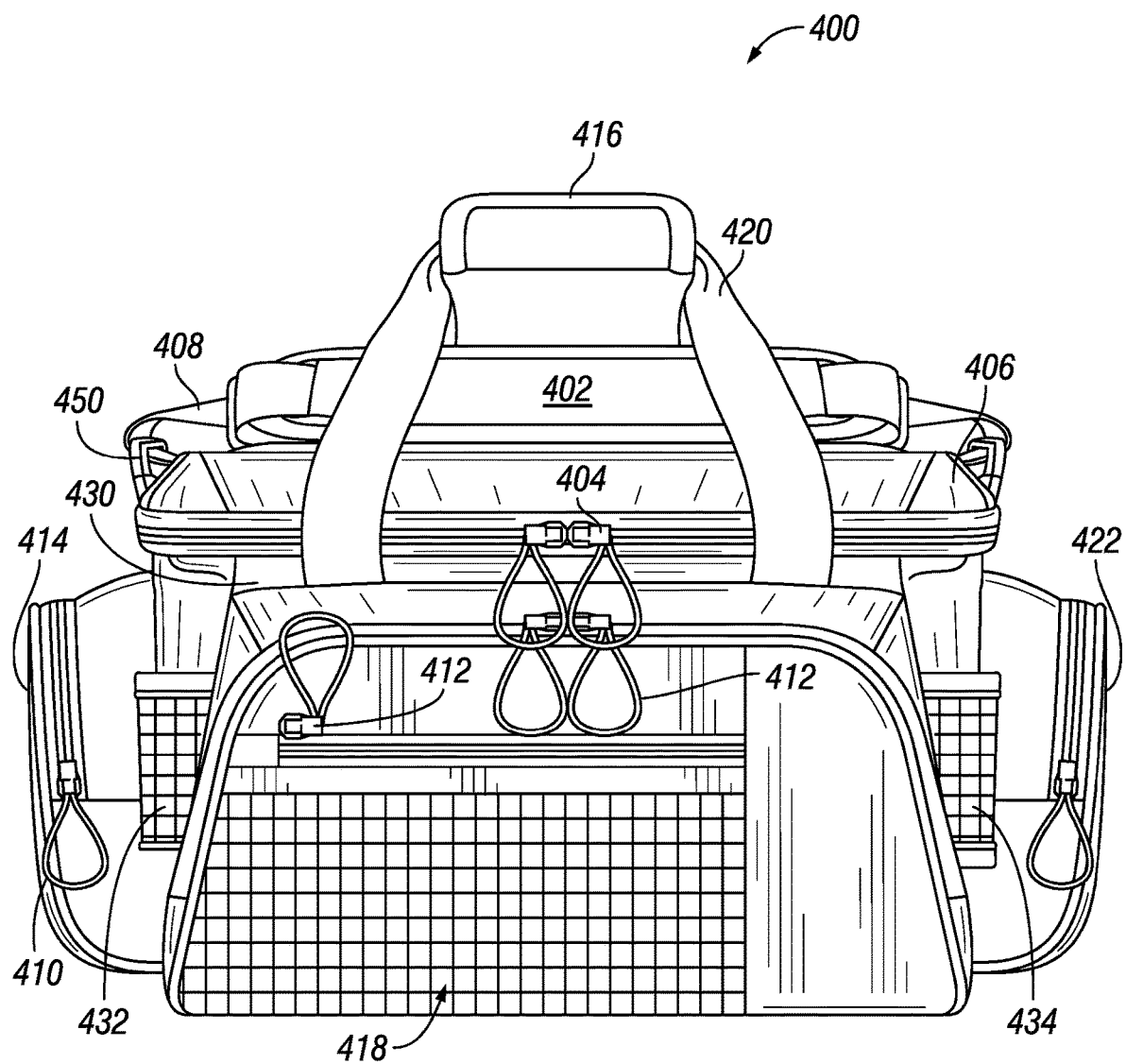
FIG. 4 is an illustration of a tackle bag from a front perspective view.

FIG. 4 is an illustration of a tackle bag from a front perspective view. A removably coupled top fastener 404 may secure the removably coupled top 406 to the main storage compartment. The removably coupled top fastener 404 could include, but is not limited to, zippers, hook and loop fasteners, buttons, snaps, and/or other fasteners and/or connections or combinations thereof. The removably coupled top 406 can partially or completely seal the main storage compartment. A partially sealed removably coupled top could allow the removably coupled top fastener 404 to seal the removably coupled top 406 onto the main storage compartment while maintaining partial visibility inside the main storage compartment. The cloth tackle bag 400 may have at least one handle 420. The handle 420 can have a handle guard 416 constructed of materials including, but not limited to, cloth, plastic, canvas, vinyl, or other similar materials and/or combinations thereof. If the cloth tackle bag 400 has a plurality of a handle 420, a handle guard 402 can join the plurality of the handle 420 using a handle fastener 417. The handle fastener 417 could include, but is not limited to, zippers, hook and loop fasteners, buttons, snaps, and/or other fasteners and/or connections or combinations thereof. In at least one example, a plurality of shoulder strap fasteners 450 may attach to the cloth tackle bag 400 to allow the shoulder strap 408 to partially or entirely disconnect from the cloth tackle bag 400. The shoulder strap fastener 450 can be attached to the removably coupled top 406, the first side wall, the second side wall, the rear wall, the front wall, and/or other similar areas of the cloth tackle bag 400 capable of supporting weight. The shoulder strap 408 may have a shoulder strap guard 402 made of material including, but not limited to, cloth, plastic, canvas, vinyl, or other similar materials and/or combinations thereof. The shoulder strap guard 402 can either slide loosely along the shoulder strap 408 or be fixed to the shoulder strap 408 using a plurality of shoulder strap guard fasteners including, but not limited to, stitching, thread, glue, adhesive, hook and loop, button and slot, snaps, or other types of fasteners or connections or combinations thereof.

In at least one example, the cloth tackle bag 400 may have a plurality of storage pouches. Storage pouches such as a first side storage pouch 432 and a second side storage pouch 434 can be constructed of a plurality of materials including, but not limited to, cloth, plastic, canvas, vinyl, or other similar materials or combinations thereof. A first side storage pouch 432 may attach to the front wall 430, the first side wall, the rear wall, the front storage compartment 418, the first side storage compartment 414, or other locations on cloth tackle bag 400 or combinations thereof. The first side storage compartment 414 can include a fastener 410. Similarly, a second side storage pouch 434 may attach to the front wall 430, the second side wall, the rear wall, the front storage compartment 418, the second side storage compartment 422, or other locations on cloth tackle bag 400 or combinations thereof. The first side storage pouch 432 and the second side storage pouch 434 can be fixed to or detachable from cloth tackle bag 400 using a plurality of storage pouch fasteners including, but not limited to, stitching, thread, glue, adhesive, hook and loop, button and slot, snaps, or other types of fasteners or connections or combinations thereof.

In at least one example, the expandable storage compartment may have a front folding section, a first side folding section, a second side folding section, a bottom folding section or a top folding section capable of attaching to a base device. The front folding section, the first side folding section, the second side folding section, the bottom folding section or the top folding section can have a rigid or flexible structure made of materials including, but not limited to, plastic, metal, cloth, vinyl, canvas, or other similar materials or combinations thereof.

In at least one example, the front folding section may have at least one first side fastener, at least one second side fastener, or at least one front folding fastener. The first side fastener, the second side fastener, or the front folding fastener can include, but are not limited to, hook and loop, button and slot, snaps, or other types of fasteners or connections or combinations thereof.

In at least one example, a first side adjustable fastener may be attached to the first side folding section or the base device using a plurality of first side folding section fasteners including, but not limited to, stitching, thread, glue, adhesive, hook and loop, button and slot, snaps, or other types of fasteners or connections or combinations thereof. Similarly, a second side adjustable fastener can be attached to the second side folding section or the base device using a plurality of second side folding section fasteners including, but not limited to, stitching, thread, glue, adhesive, hook and loop, button and slot, snaps, or other types of fasteners or connections or combinations thereof.

The expandable storage compartment may be capable of expanding to a plurality of sizes. In at least one example, a first side adjustable fastener can connect to the first side fastener or a second side folding fastener may connect to the second side fastener. This configuration can be used to create an expanded storage compartment capable to storing at least one item. In at least other example, a first side adjustable fastener or a second side folding fastener may connect to the front folding fastener. This configuration can create an unexpanded storage compartment capable of compressing against the base device.

Figure 5:
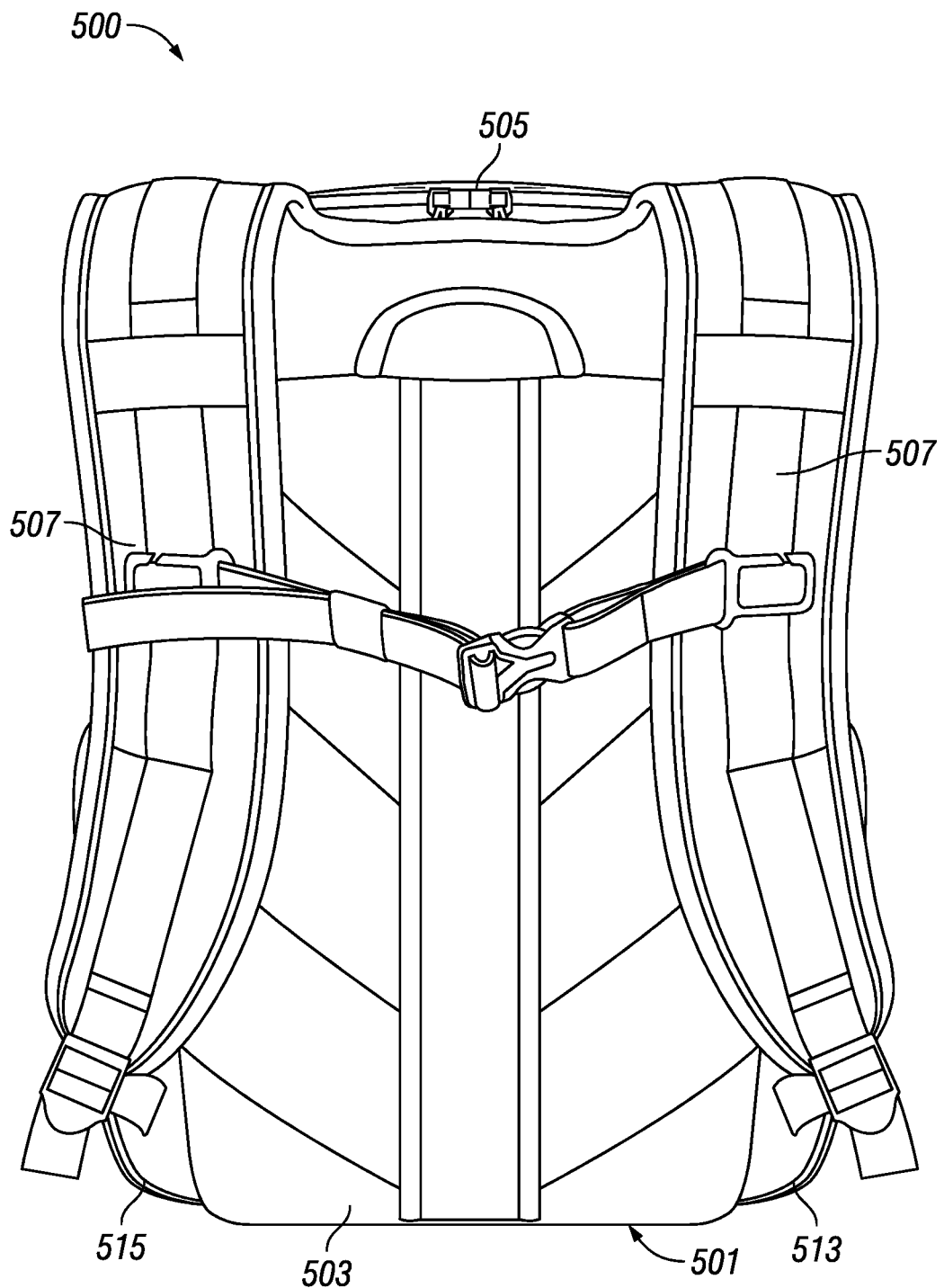
FIG. 5 is an illustration of the exterior back of a backpack.
Figure 6:
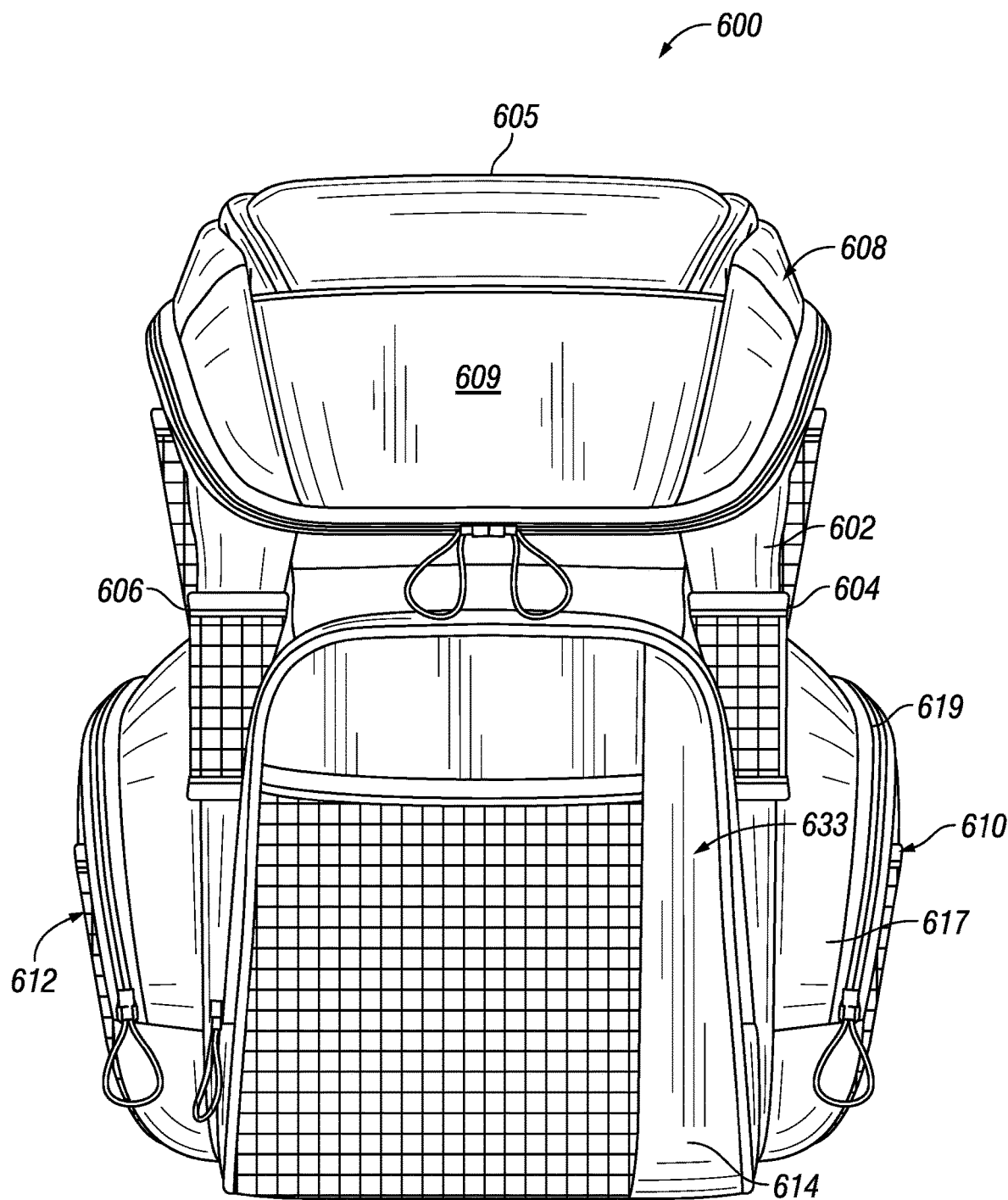
FIG. 6 is an illustration of the exterior front of a backpack.

FIGS. 5-9 are illustrations of backpack 500, 600, 700, 800, 900, respectively. With reference to FIG. 5, a backpack 500 can be a storage device capable of being carried by a user (not illustrated) with at least one strap 507. In at least one embodiment, the at least one strap 507 may comprise two or more straps. The backpack 500 can generally have a rectangular shape defined by a back wall 501, a front wall 602, a first side wall 604, a second side wall 606, a bottom wall 503, and/or a top wall 505. In at least one example, the back wall 501, front wall 602, first side wall 604, the second side 606, a bottom wall 503, and/or a top wall 505 may have a rigid interior layer made of solid materials including, but not limited to, plastic, metal or other solid materials with exterior layers of supportive materials including, but not limited to, cloth, vinyl, canvas, or other similar materials. In at least one embodiment, the back wall 501, the front wall 602, the first side wall 604, the second side 606, the bottom wall 503, or the top wall 605 can be constructed having both an interior and exterior composed of flexible or fabric like materials such a cloth, vinyl, canvas, or other similar materials. Fabric like materials can be cut to create in a pattern that defines and creates the back wall 501, front wall 602, first side wall 604, the second side 606, a bottom wall 503, or a top wall 505 of the backpack 500, 600, 700, 800, 900.

In at least one example, a top storage compartment 708, 908 may be defined by the top wall 705, a front panel 609, the first side wall 604, the second side wall 606, and a top portion bottom panel 711. The backpack 700 is capable of being carried by a user (not illustrated) with at least one strap 707. A first side storage compartment 610 can be defined by to the first side wall 604, a rear first side panel 513, a front first side panel 617, a first side top panel 619, and a first side outward panel 918 and a first side bottom panel (not illustrated). A second side storage compartment 812 may be defined by the second side wall 606, a rear second side panel 515, a front second side panel 721, a second side outward panel 712, and a second side top panel 725 and a second side bottom panel (not illustrated). A front storage compartment 814 can be defined by the front wall 702, a front left panel 727, a front right panel 929, a front top panel 831, a front outward panel 633, and a front bottom panel (not illustrated). In at least one embodiment, the top storage compartment 608, the first side storage compartment 610, the second side storage compartment 612, and/or the front storage compartment 914 can have a rigid structure, a flexible structure and/or some combination thereof. In at least one example of the present disclosure, the top storage compartment 608, the first side storage compartment 610, the second side storage compartment 612, and/or the front storage compartment 614 may have a rigid interior layer made of solid material including, but not limited to, plastic, metal or other solid materials with at least one exterior layer of supportive materials including, but not limited to, cloth, vinyl, canvas, or other similar materials or combinations thereof. In at least one embodiment, the top storage compartment 608, the first side storage compartment 610, the second side storage compartment 612, or the front storage compartment 614 can be constructed having an interior and exterior composed of fabric like or flexible materials such a cloth, vinyl, canvas, or other similar materials or combinations thereof.

It is within the scope of the present disclosure for the top storage compartment 708, the first side storage compartment 610, the second side storage compartment 612, and/or the front storage compartment 614 to be detachable from or fixed to the walls of backpack 700 using a plurality of couplings including, but not limited to, stitching, thread, glue, adhesive, hook and loop, button and slot, snaps, or fasteners or connections or combinations thereof. In at least one example of the present disclosure, the backpack 800 can have a main storage compartment 802 capable of accommodating bait tray 818. A main storage compartment 816 could be defined by the back wall 501, the front wall 602, the first side wall 804, the second side 606, a bottom wall 503, and/or a top wall 505. A user could access main storage compartment 802 using a plurality of fasteners including, but not limited to, at least one zipper, hook and loop, button and slot, snaps, or other types of fasteners and/or connections or combinations thereof. In at least one embodiment, the back wall 501, the front wall 602, the first side wall 604, the second side 606 may have an expandable storage compartment (as described in FIGS. 1-4) coupled to one or more of the walls. In at least one example, the expandable storage compartment can expand to create the expanded storage compartment 730. An expandable storage top connector 740 may be used to enclose the expanded storage compartment 730. The expandable storage top connector 740 can be adjustable using an expandable storage top fastener 736 to allow for the storage a plurality of equipment and other items inside the expanded storage compartment 730. The expandable storage top fastener 736 could include, but is not limited to, zippers, hook and loop fasteners, buttons, snaps, other fasteners or connections, or combinations thereof. Additionally, the expandable storage top connector 740 may allow for a plurality of widths to either fully or partially enclose the expandable storage compartment 730.

Figure 7:
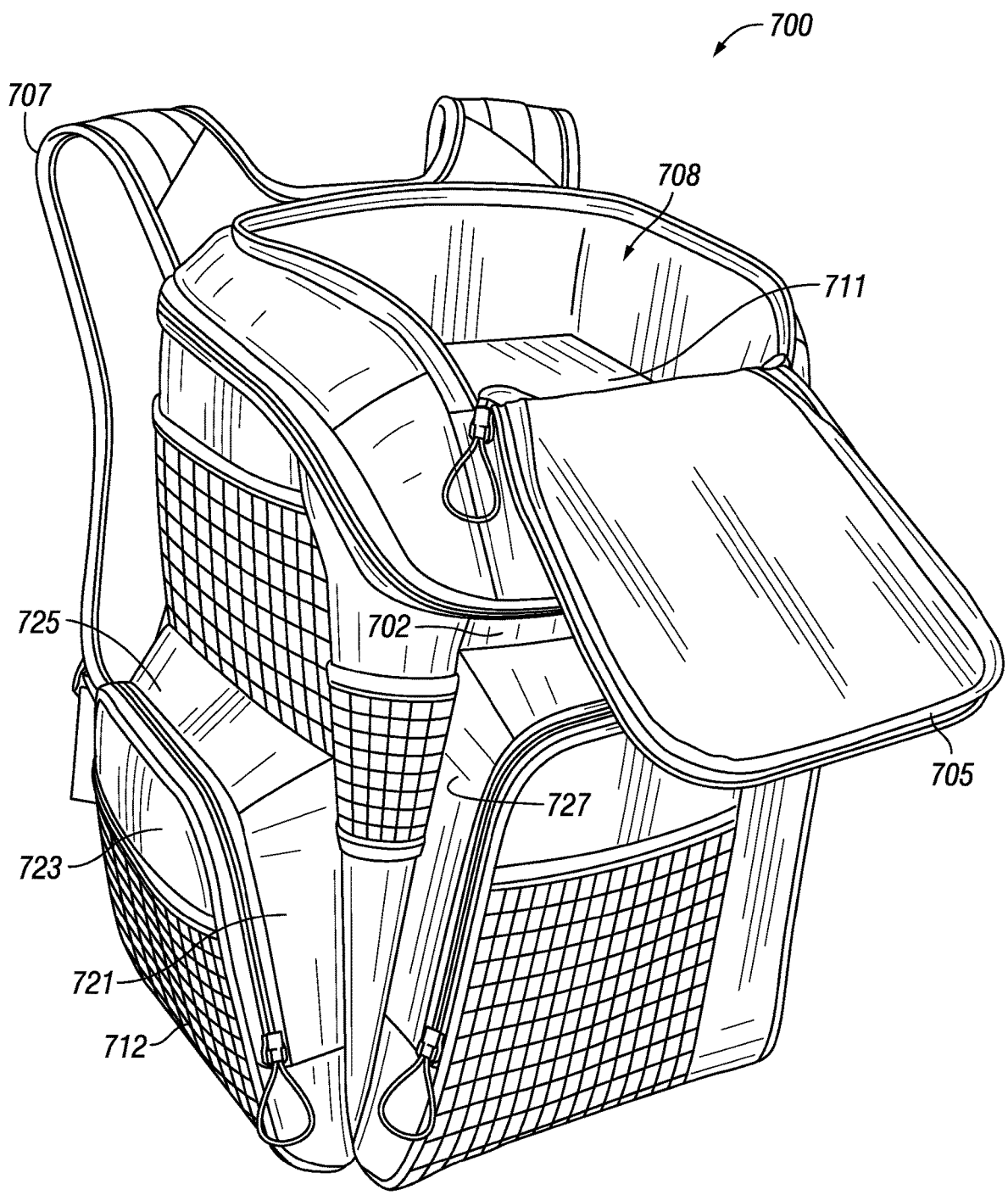
FIG. 7 is an illustration of the expanded top storage of a backpack.
Figure 8:
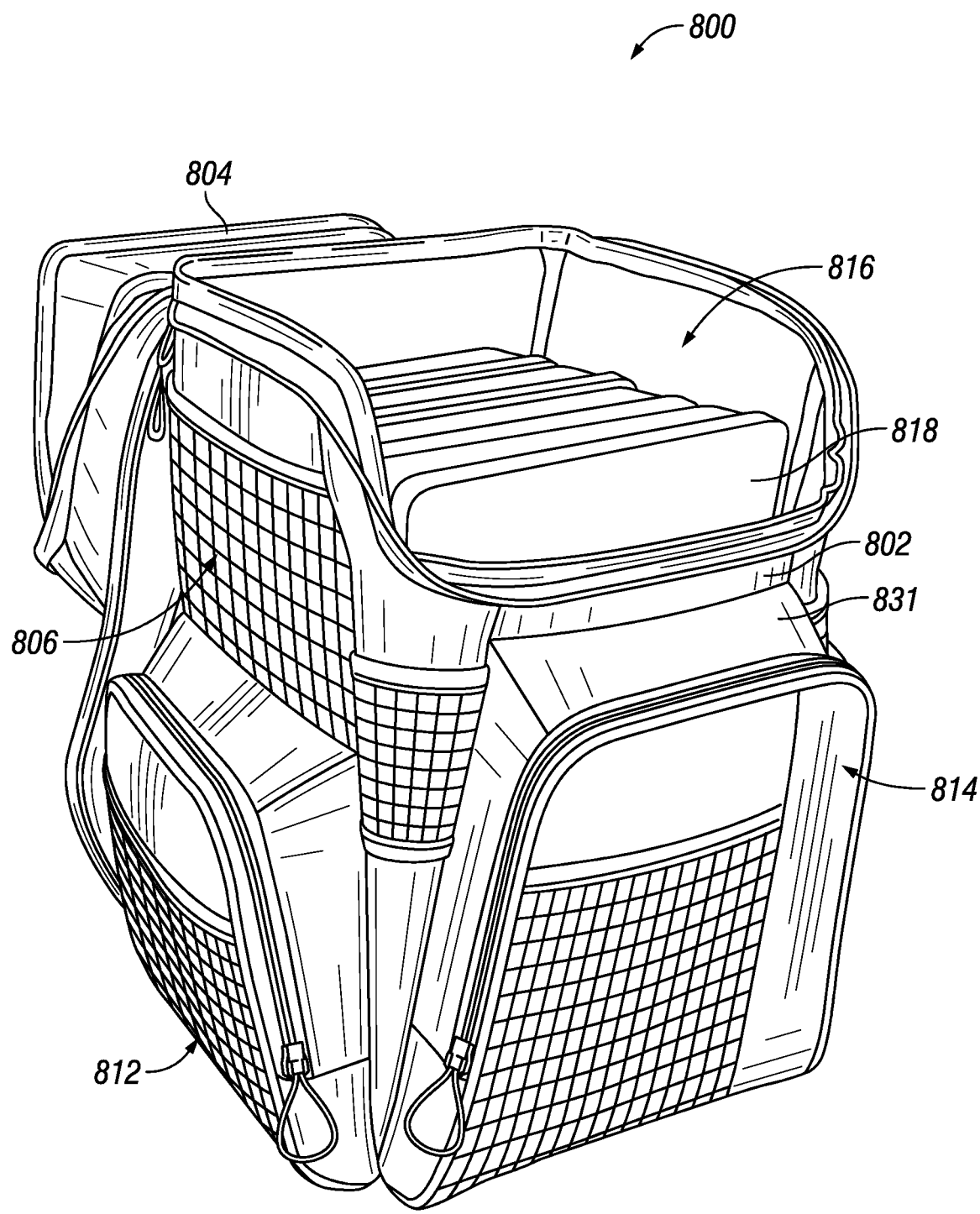
FIG. 8 is an illustration of the expanded main storage of a backpack.
Figure 9:
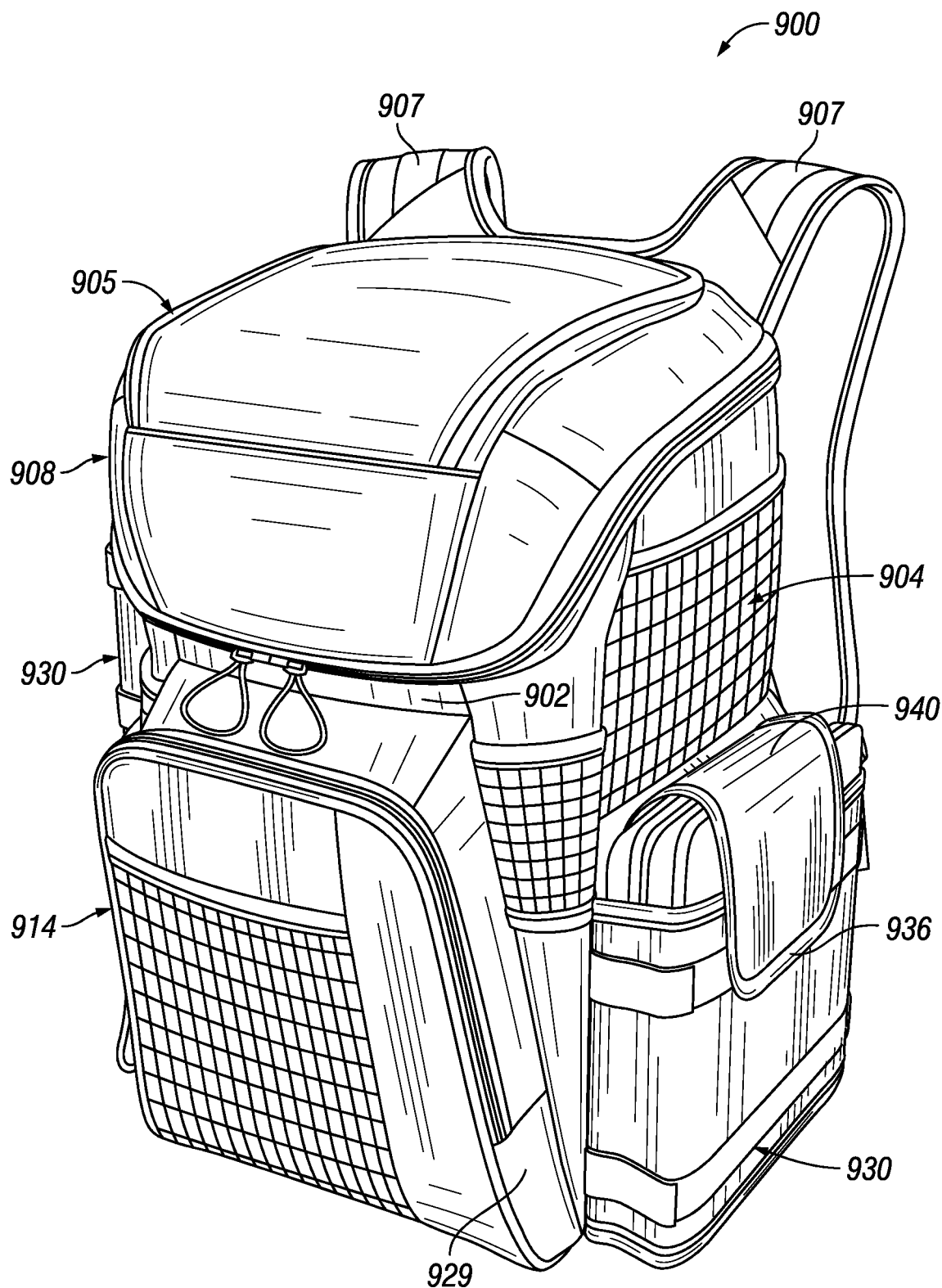
FIG. 9 is an illustration of the exterior of the main storage compartment of a backpack from a first side angled perspective view.

In at least one example of the present disclosure, the backpack 900 can have at least one shoulder strap 907. It is within the scope of the present disclosure for shoulder strap 907 to be attached to at least one point along the back wall 501, front wall 602, first side wall 604, the second side 606, a bottom wall 503, and/or a top wall 905 of the backpack 900, or other similar areas of backpack 900 capable of supporting weight using a plurality of couplings including, but not limited to, stitching, thread, glue, adhesive, hook and loop, button and slot, snaps, fasteners or connections, or combinations thereof. Shoulder strap 907 may be constructed utilizing materials such as, but not limited to, cloth, vinyl, rope, plastic, or other similar materials. In at least one example, the expandable storage compartment can expand to create the expanded storage compartment 830. An expandable storage top connector 840 may be used to enclose the expanded storage compartment. The expandable storage top connector 840 can be adjustable using an expandable storage top fastener 836 to allow for the storage a plurality of equipment and other items inside the expanded storage compartment. The expandable storage top fastener 836 could include, but is not limited to, zippers, hook and loop fasteners, buttons, snaps, other fasteners or connections, or combinations thereof. Additionally, the expandable storage top connector 840 may allow for a plurality of widths to either fully or partially enclose the expandable storage compartment In some examples, the expandable storage compartment (as shown in FIGS. 7-9 as 730, 830, 930) can be attached to a backpack 500, 600, 700, 800, 900 using a plurality of couplings including, but not limited to, stitching, thread, glue, adhesive, hook and loop, button and slot, snaps, fasteners or connections, or combinations thereof. It is within the scope of the present disclosure for expandable storage compartment 930 to attach to a plurality of places along backpack 900 such as back wall 501, front wall 902, first side wall 904, or the second side 606. In other examples, the backpack 900 may have a structure comparable to folding side using folding side brace. Such a structure could allow a wall such as a front wall 902 to separate from backpack 900 at a perpendicular angle transforming the wall into flat surface which can persist while a fisherman carries backpack 900. In at least one example, the expandable storage compartment may expand to create the expanded storage compartment 930. An expandable storage top connector 940 can be used to enclose the expanded storage compartment 930. The expandable storage top connector 940 may be adjustable using an expandable storage top fastener 936 to allow for the storage a plurality of equipment and other items inside the expanded storage compartment. The expandable storage top fastener 936 could include, but is not limited to, zippers, hook and loop fasteners, buttons, snaps, other fasteners or connections, or combinations thereof. Additionally, the expandable storage top connector 940 can allow for a plurality of widths to either fully or partially enclose the expandable storage compartment 936.

In at least one example, the cloth tackle bag 100, 200, 300, 400 or the backpack 500, 600, 700, 800, 900 may be manufactured using the following steps: cutting fabric like materials to create a front wall, rear wall, a first side wall, a second side wall, a bottom wall, and a removably coupled top of a main storage compartment; cutting fabric like materials to create a front folding section, a first side folding section, a second side folding section, and a bottom folding section of an expandable storage compartment; sewing said sections and walls together to create the main storage compartment and the expandable storage compartment; and coupling the main storage compartment and expandable storage compartment, wherein the first side folding section and the first side wall, the second side folding section and the second side wall, and the bottom section and bottom walls are coupled to one another through a stitching process.

While fishing equipment is referenced herein, the present disclosure could be utilized for other portable storage devices and sporting goods. In certain embodiments, the present disclosure can include a plurality of fishing equipment such as tackle boxes and bait boxes. The fishing equipment may contain a main storage compartment and a plurality of attached storage compartments including an expandable storage compartment. A fastening member, such as zippers, hook and loop fasteners, buttons, snaps, or other fasteners can secure each storage compartment while providing easy access to any stored items. The fishing equipment may contain a one handle or shoulder strap coupled on or near the main storage compartment. Additionally, any expandable storage compartment can allow at least partial visibility to items stored inside the expandable storage compartment.

While this disclosure has been particularly shown and described with reference to preferred embodiments, it will be understood by those skilled in the art that various changes in form and detail may be made therein without departing from the spirit and scope of the invention. The inventors expect skilled artisans to employ such variations as appropriate, and the inventors intend the invention to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, and by way of example, although the headings refer to a "Technical Field," the claims should not be limited by the language chosen under this heading to describe the so-called field. Further, a description of a technology as background information is not to be construed as an admission that certain technology is prior art to any embodiment(s) in this disclosure. Neither is the "Brief Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

I claim:

1. A storage system comprising:
a storage apparatus having a main storage compartment, the main storage compartment being defined by a front wall, a rear wall, a first side wall, a second side wall, and a bottom wall, with each of said walls being of a cloth like material;
a removably coupled top coupled to the main storage compartment through a fastener; and
an expandable storage compartment defined by a front folding section, a first side folding section, a second side folding section, an expandable storage top fastener, and a bottom folding section, wherein the expandable storage compartment allows for partial visibility of contents when the expandable storage top fastener attaches to the expandable storage compartment; and
at least one tray comprising a top portion, a bottom portion, and at least one securing mechanism, wherein the expandable storage compartment is configured to receive the at least one tray when the expandable storage compartment is in an expanded configuration.

2. The storage system of claim 1, wherein the expandable storage compartment comprises an expandable storage first side adjustable fastener, and an expandable storage second side adjustable fastener, wherein the expandable storage top fastener attaches to the expandable storage compartment via an expandable storage upper fastener or an expandable storage compartment lower fastener, wherein the expandable storage first side adjustable fastener and the expandable storage second side adjustable fastener attach to the expandable storage compartment via the expandable storage upper fastener.

3. The storage system of claim 2, wherein the expandable storage top fastener is configured to attach to the expandable storage compartment via the expandable storage upper fastener in the expanded configuration.

4. The storage system of claim 2, wherein the expandable storage top fastener is configured to attach to the expandable storage compartment via the expandable storage compartment lower fastener in an unexpanded configuration.

* * * * *